(12) United States Patent
Maltsev et al.

(10) Patent No.: US 8,289,865 B2
(45) Date of Patent: *Oct. 16, 2012

(54) METHOD AND APPARATUS TO EXCHANGE CHANNEL INFORMATION

(75) Inventors: Alexander A. Maltsev, Nizhny Novgorod (RU); Ali S. Sadri, San Diego, CA (US); Vadim S. Sergeyev, Nizhny Novgorod (RU); Sergey Tiraspolsky, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 720 days.

This patent is subject to a terminal disclaimer.

(21) Appl. No.: 12/397,349

(22) Filed: Mar. 4, 2009

(65) Prior Publication Data

US 2009/0196232 A1  Aug. 6, 2009

Related U.S. Application Data

(63) Continuation of application No. 10/746,265, filed on Dec. 29, 2003, now Pat. No. 7,593,347.

(51) Int. Cl.
*H04L 12/28* (2006.01)
(52) U.S. Cl. .................. 370/252; 370/311; 370/338
(58) Field of Classification Search .................. 370/252, 370/203, 311, 328, 338
See application file for complete search history.

(56) References Cited

U.S. PATENT DOCUMENTS

| | | | |
|---|---|---|---|
| 5,673,259 A | 9/1997 | Quick, Jr. | |
| 6,175,550 B1 | 1/2001 | van Nee | |
| 6,603,801 B1 | 8/2003 | Andren et al. | |
| 6,678,310 B1 | 1/2004 | Andren et al. | |
| 6,711,124 B2 | 3/2004 | Khayrallah et al. | |
| 6,754,170 B1 | 6/2004 | Ward | |
| 6,870,888 B1 * | 3/2005 | Shapiro et al. | 375/260 |
| 6,885,708 B2 | 4/2005 | Thomas et al. | |
| 6,891,832 B1 | 5/2005 | Chien et al. | |
| 7,016,429 B1 | 3/2006 | Dogan et al. | |
| 7,039,000 B2 | 5/2006 | You et al. | |
| 7,065,036 B1 | 6/2006 | Ryan | |
| 7,106,715 B1 | 9/2006 | Kelton et al. | |
| 7,149,213 B1 | 12/2006 | Rosner et al. | |
| 7,295,599 B1 | 11/2007 | Karsi | |
| 7,349,436 B2 | 3/2008 | Maltsev et al. | |
| 2002/0181390 A1 | 12/2002 | Mody et al. | |
| 2002/0183010 A1 | 12/2002 | Catreux et al. | |
| 2003/0135797 A1 | 7/2003 | Choi | |
| 2003/0193889 A1 | 10/2003 | Jacobsen | |

(Continued)

FOREIGN PATENT DOCUMENTS

EP  0 869 647  10/1998

(Continued)

OTHER PUBLICATIONS

Chinese Office Action of Application No. 200480039348.6 Dated Feb. 6, 2009.

(Continued)

*Primary Examiner* — Luat Phung
(74) *Attorney, Agent, or Firm* — Shichrur & Co.

(57) ABSTRACT

A method and apparatus to exchange channel state information between two or more stations is provided. The channel state information may be used to adapt a power, a transmission rate and a modulation scheme of a transmitted signal. Other embodiments are described and claimed.

22 Claims, 4 Drawing Sheets

U.S. PATENT DOCUMENTS

| | | | |
|---|---|---|---|
| 2003/0215022 | A1 | 11/2003 | Li et al. |
| 2003/0231715 | A1 | 12/2003 | Shoemake et al. |
| 2004/0047296 | A1 | 3/2004 | Tzannes et al. |
| 2004/0054820 | A1 | 3/2004 | Karaoguz et al. |
| 2004/0131011 | A1 | 7/2004 | Sandell et al. |
| 2004/0151109 | A1 | 8/2004 | Batra et al. |
| 2004/0151145 | A1 | 8/2004 | Hammerschmidt |
| 2004/0151146 | A1* | 8/2004 | Hammerschmidt ......... 370/338 |
| 2004/0179507 | A1 | 9/2004 | Batra et al. |
| 2005/0013391 | A1* | 1/2005 | Boer et al. ............... 375/340 |
| 2005/0058057 | A1 | 3/2005 | Maltsev et al. |
| 2005/0068916 | A1 | 3/2005 | Jacobsen et al. |
| 2005/0135295 | A1* | 6/2005 | Walton et al. ............. 370/328 |
| 2005/0135318 | A1 | 6/2005 | Walton et al. |
| 2005/0147075 | A1 | 7/2005 | Terry |
| 2005/0243954 | A1 | 11/2005 | Li |
| 2006/0007898 | A1 | 1/2006 | Maltsev et al. |

FOREIGN PATENT DOCUMENTS

| | | |
|---|---|---|
| EP | 1 317 094 | 6/2003 |
| EP | 1 357 718 | 10/2003 |
| WO | 01/08369 | 2/2001 |
| WO | 01/67702 | 9/2001 |

OTHER PUBLICATIONS

First Office Action of U.S. Appl. No. 10/743,309, filed Dec. 23, 2003. Mailing date of Office Action Jul. 26, 2007.
Second Office Action of U.S. Appl. No. 10/743,309, filed Dec. 23, 2003. Mailing date of Office Action Jan. 9, 2008.
Final Office Action of U.S. Appl. No. 10/743,309, filed Dec. 23, 2003. Mailing date of Final Office Action Jul. 3, 2008.
Bangerter B. et al., "High-Throughput Wireless LAN Air Interface", Intel Technology Journal, vol. 7, No. 3, Aug. 19, 2003, pp. 47-57.
International Search Report for PCT/US2004/041436, mailed on Jul. 8, 2005.
Jang, Jiho, Kwang Bok Lee and Yong-Hwan Lee, "Transmit Power and Bit Allocations for OFDM Systems in a Fading Channel", GLOBECOM 2003, pp. 858-862.
Zhao, Yuping and Aiping Huang, "A Novel Channel Estimation Method for OFDM Mobil Communication Systems Based on Pilot Signals and Transform-Domain Processing", IEEE 1997, pp. 2089-2093.
Final Office Action for U.S. Appl. No. 10/746,265 mailed on May 16, 2008.
Non-final Office Action for U.S. Appl. No. 10/746,265 mailed on Dec. 31, 2007.
Non-final Office Action for U.S. Appl. No. 10/746,265 mailed on Jul. 9, 2007.
Intel Technology Journal, Wireless Technologies, vol. 7, Issue 3. Aug. 19, 2003, ISSN 1535-864X, pp. 1-68.
Liu H. H. et al., "New frame-based network allocation vector for 802.11 b multirate wireless LANs". IEEE Proceedings: Communications, Institution of Electrical Engineers, GB, vol. 149. No. 3, Jun. 14, 2002, pp. 147-151.
International Search Report for PCT/US2004/038476, mailed on Apr. 1, 2005.
Office Action for Chinese Patent Application No. 200480039348.6 mailed on Aug. 14, 2009.
Office Action for Chinese Patent Application No. 201010175262.3 mailed on Apr. 20, 2011.
Office Action for Malaysian Patent Application No. PI 20042775 mailed on Dec. 7, 2007.
Extended European Search Report for European Patent Application 10175641.9 mailed on Oct. 21, 2011.
Communication for European Patent Application 10175641.9 mailed on Nov. 28, 2011.
Publication of the European Search Report for European Patent Application 10175641.9 dated on Nov. 23, 2011.
Written Opinion for PCT application PCT/ 2004/038476 mailed on Apr. 1, 2005.
International Preliminary Report on Patentability for PCT application PCT/2004/038476 Issued on Jul. 3, 2006.
Written Opinion for PCT application PCT/US2004/041436.
International Preliminary Report on Patentability for PCT application PCT/US2004/041436 Issued on Jun. 26, 2006.
Office Action for European Patent Application No. 04811255.1 mailed on Oct. 9, 2006.
Office Action for European Patent Application No. 04811255.1 mailed on Jul. 10, 2007.
Office Action for European Patent Application No. 04811255.1 mailed on Aug. 1, 2008.
Office Action for Chinese Patent Application No. 201010175262.3 mailed on Mar. 22, 2012; 16 pages.
Decision on Rejection for Chinese Patent Application No. 201010175262.3 mailed on Aug. 3, 2012; 18 pages.

* cited by examiner

METHOD AND APPARATUS TO EXCHANGE CHANNEL INFORMATION

CROSS REFERENCE TO RELATED APPLICATIONS

This application is a continuation of prior application Ser. No. 10/746,265, entitled "METHOD AND APPARATUS TO EXCHANGE CHANNEL INFORMATION", filed on Dec. 29, 2003 now U.S. Pat. No. 7,593,347, which is incorporated by reference in its entirety.

BACKGROUND OF THE INVENTION

In wireless local area networks (WLAN), for example, WLANs that are based on IEEE-802.11-1999 standard, a wideband (WB) Orthogonal Frequency Division Multiplexing (OFDM) modulation schemes or duplex time division multiplexing (TDM) modulation schemes may be used. In those systems the data rate and throughput of network may be increased by increasing spectrum bandwidth of transmitted signals and/or by using several OFDM channels in parallel and/or by applying adaptive bit and power loading (BPL) information to a data packet, if desired. An OFDM signal may include a predefined number of sub-carriers pilot signals, for example, 16 sub-carriers. The WLAN may include stations that may transmit data packets acting over a non-stationary frequency-selective shared wireless medium, which may be referred to as "channel".

For example, transmission of data packed may be done by the stations in-doors. Under these conditions the signal propagation may include multi-path and non-stationary characteristics. The multi-path may be caused by multiple scatters, for example, walls, ceilings, and various objects, and may result in frequency selectivity of a channel transfer function. Non-stationarity may be caused by motion of scattering objects resulting in Doppler shift of received signal frequency. An additional non-stationarity may be caused by unpredictable behavior of interferences in the same band as the data packet. These factors may result in greater Packet Error Rate (PER) and significantly reduce the throughput performance of wireless network.

BRIEF DESCRIPTION OF THE DRAWINGS

The subject matter regarded as the invention is particularly pointed out and distinctly claimed in the concluding portion of the specification. The invention, however, both as to organization and method of operation together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components, and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as, for example, "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage medium that may store instructions to perform actions and/or process, if desired.

Unless specifically stated otherwise, as apparent from the following discussions, it is appreciated that throughout the specification discussions utilizing terms such as, for example, "establishing," "sending", "exchangingi" or the like, refer to the action and/or processes of a station of a communication system, or similar communication device, that manipulate and/or transform and/or transfer data packets over a shared physical medium, if desired.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Figure 1:
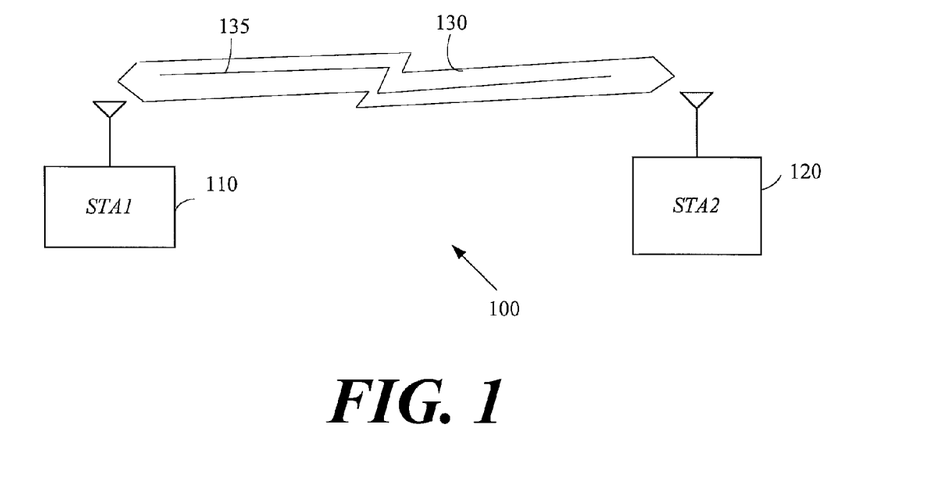
FIG. 1 is a schematic illustration of a wireless communication system according to an exemplary embodiment of the present invention.

Turning first to FIG. 1, a wireless communication system 100, for example, a WLAN communication system is shown. Although the scope of the present invention is not limited in this respect, the exemplary WLAN communication system 100 may be defined, for example, by the IEEE 802.11-1999 standard, and may include at least a station 110 (STA1) and a station 120 (STA2). In some embodiments, station 110 and station 120 may transmit and/or receive one or more data packets over a channel 130 of wireless communication system 100. The packets may include data, control messages, network information, and the like.

Although the scope of the present invention is not limited in this respect, in some embodiments of the present invention wireless communication system may operate under IEEE 802.11-1999 and/or IEEE 802.16 standards and may transmit and/or receive orthogonal frequency division multiplexed (e.g., OFDM) communication signals. In some embodiments, the communication system may communicate an OFDM packet comprising a several OFDM symbols over a wideband communication channel. The wideband communication channel may include one or more sub-channels. The sub-channels may be frequency-division multiplexed (FDM) (i.e., separated in frequency) and may be within a predetermined frequency spectrum. In addition, the sub-channels may consist of a plurality of orthogonal sub-carriers. In some embodiments, the orthogonal sub-carriers of a sub-channel may be closely spaced OFDM sub-carriers, if desired. For example, to achieve orthogonality between closely spaced sub-carriers, in these embodiments, the sub-carriers of a particular sub-channel may have a null at substantially a center frequency of the other sub-carriers. In some embodiments of the invention, station 110 may communicate with station 120 via a link 135 that may transport OFDM signals, if desired.

Although the scope of the present invention is not limited in this respect, in OFDM WLAN systems the network throughput performance and reliability of data transmission may be increased by applying adaptive BPL per sub-carrier techniques as are known in the art, for example, a "water-filling" solution or any other suitable modulation and/or coding selection technique. These techniques may use feedback channel state information (CSI) exchange schemes, which may use feedback information transmitted from station 110 (e.g. a receiving station) to station 120 (e.g. a transmitting station). In some embodiments of the invention, a CSI exchange scheme may be used to control data transmission over channel 130 in conjunction with adaptive BPL algorithms, if desired.

In some embodiments of the present invention, a channel state information exchange sequence may include transmitting measured characteristics of channel 130 from station 110 to station 120. In other embodiments of the invention, the channel state information exchange sequence may include transmitting from station 110 to station 120 instructions, which may allow controlling the parameters of signal transmissions by stations 110 and 120, although the scope of the present invention is not limited in this respect. In some embodiments of the invention, these instructions may include instructions defining a modulation order of a sub-carrier, a power level of a sub-carrier and the like, which may be collectively referred to herein as BPL information. In some embodiments of the invention, these instructions may include values corresponding to differences in channel state information or in BPL information obtained by processing two or more consecutive packets, although the scope of present invention is not limited in this respect.

Although the scope of the present invention is not limited in this respect, in embodiments of the invention, at least two schemes of feedback channel information exchange, for example, a "Normal" scheme and/or "Simplified", scheme may be applied. The "Normal" and "Simplified" feedback channel information exchange schemes may differ in an amount of information needed to perform adaptation. In those embodiments, the feedback CSI exchange scheme may be as follows: transmitter (e.g. station 110) may incorporate into data packet information related to an overall transmitted power. The receiving station (e.g. station 120) may estimate the channel transfer function during reception of the transmitted data packet, may perform BPL calculations using the estimated channel transfer function and information related to the power of the transmitted packet, and may incorporate the information related to calculated optimal BPL per sub-carrier values into a response packet. The transmitting station (e.g. station 110) may extract this BPL information and may assign modulation order per sub-carrier and/or adjust power level of the sub-carrier when transmitting a response data packet in accordance with the BPL information.

Figure 2:
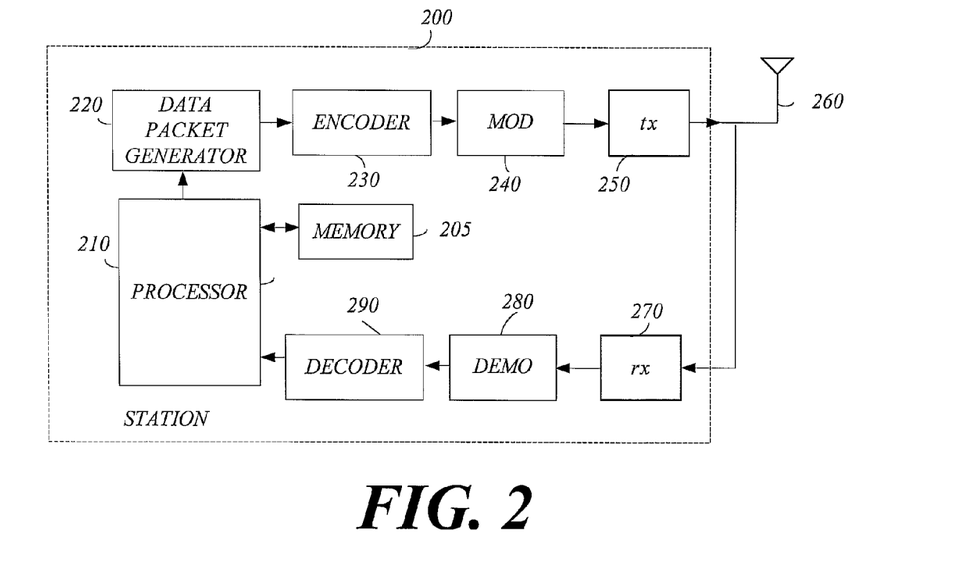
FIG. 2 is a block diagram of a station according to an exemplary embodiment of the present invention.

Turning to FIG. 2, a block diagram of a station (STA) 200 according to some exemplary embodiments of the present invention is shown. Although the scope of the present invention is not limited in this respect, station 200 may include, a processor 210, a memory 205, a data packet generator 220, an encoder 230, a modulator 240, a transmitter (TX) 250 to transmit radio frequency (RF) signals an antenna 260, if desired. Station 200 may further include a receiver (RX) 270 to receive an OFDM signal, which may include a data packet, a demodulator 280 and a decoder 290.

Although the scope of the present invention is not limited in this respect, demodulator 280 may demodulate the data packet according to demodulation schemes such as, for example, binary phase shift keying (BPSK), quadrature phase shift keying (QPSK), quadrature-amplitude modulation (QAM) with different order such as, for example, QAM16, QAM32, QAM64, QAM128, QAM256 and the like, differential BPSK (DBPSK), differential QPSK (DQPSK), and the like.

Although the scope of the present invention is not limited in this respect, antenna 260 may be an omni-directional antenna, a monopole antenna, a dipole antenna, an end fed antenna, a circularly polarized antenna, a micro-strip antenna, a diversity antenna, and the like.

Although the scope of the present invention is not limited in this respect, data packet generator 220 may generate the data packet. An example of the data packet structure is described in detail below with reference to FIG. 3. In some embodiments of the invention, processor 210 may calculate parameters of BPL during reception of other data packets from other stations. In some embodiments of the invention, processor 210 may store the calculated parameters in memory 205. Data packet generator 220 may load BPL parameters from memory 205 to generate a response packet, if desired.

Although the scope of the present invention is not limited in this respect, encoder 230 may encode the data packet according to encoding schemes such as, for example, a convolutional encoding scheme, a block encoding scheme, a Reed-Solomon code encoding scheme, a Turbo code encoding scheme, a low-density parity-check (LDCP) encoding scheme, or the like.

Although the scope of the present invention is not limited in this respect, modulator 240 may modulate the encoded data packet on sub-carriers according to modulation schemes such as, for example, binary phase shift keying (BPSK), QPSK, quadrature-amplitude modulation (QAM) with different order such as, for example, QAM16, QAM32, QAM64, QAM128, QAM256 and the like, differential BPSK (DBPSK), differential QPSK (DQPSK), and the like. In some embodiments of present invention the modulation scheme may be chosen individually for sub-carriers of a plurality of substantially orthogonal sub-carriers.

Figure 3:
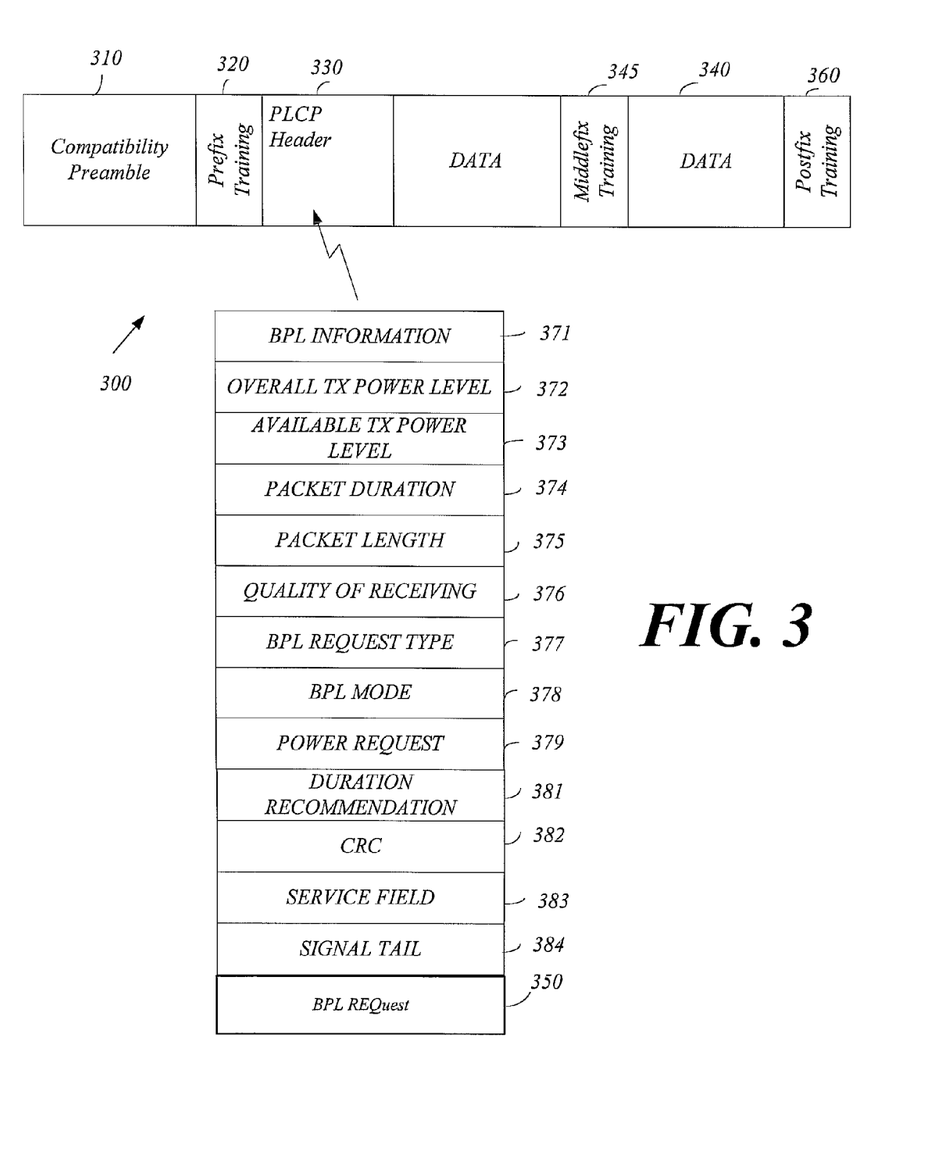
FIG. 3 is a schematic illustration of a data packet structure according to an exemplary embodiment of the present invention.

Turning to FIG. 3, a schematic illustration of a structure of a portion of a data packet 300 according to an exemplary embodiment of the present invention is shown. Although the scope of the present invention is not limited in this respect, the portion of the data packet 300 may include a compatibility preamble field 310, a prefix training field 320, a PLCP header 330, a data field 340, a middle-fix training field 345, and postfix training field 360.

Although the scope of the present invention is not limited in this respect, compatibility preamble field 310 and prefix, middle-fix and postfix training fields 320, 345 and 360 may be used to perform tasks such as, for example, timing synchronization, coarse and fine frequency offset estimation, channel transfer function estimation, channel variation estimation and the like. In addition, compatibiity preamble field 310 may carry a plurality of logical functions such as, for example, packet type detection, support of compatibility with legacy devices, possibility of a frequency division multiple access (FDMA) mode usage and the like.

Although the scope of the present invention is not limited in this respect, PLCP header 330 may include data representing a collection of parameters required to demodulate data packet 300 and/or may be used as an additional training field, if desired. In some exemplary embodiments of the invention, the over-all channel width may be 80 MHz and may include four sub-channels with a channel width of approximately 20 MHz. However, it should be understood by one skilled in the art that in other embodiments of the invention the channel width, the number of sub-channels and the width of the sub-channels may differ from those described in the above example. The information in PLCP header 330 may be encoded by encoder 230 with a convolutional code at a rate of ½, if desired, and may be modulated by modulator 240 with a robust modulation scheme such as, for example, binary phase shift keying (BPSK) modulation, if desired, although the scope of the invention is not limited in this respect. In addition, the PLCP header 330 may be used to perform, for example, frequency and phase offset estimation refinement, channel estimation refinement, and the like.

Although the scope of the present invention is not limited in this respect, the flowing parameters of PLCP header 330 may be used in a feedback channel state information exchange protocol for at least one of "Normal" or "Simplified" modes, if desired. In embodiments of the invention, the first parameter may be BPL Information 371. BPL Information parameter 371 may be encoded with code rate ½ and may be modulated by BPSK modulation scheme. BPL Information 371 may occupy for example, 3 OFDM symbols of 4 available OFDM symbols for any desirable channel bandwidth.

Although the scope of the present invention is not limited in this respect, the second parameter may be an Overall Transmitted Power Level 372 (e.g. 4 bits). This parameter may reflect the power level, which may be used during transmission of data packet 300. The power level may be provided with 3 dB intervals down from a predefined maximal value. This parameter in conjunction with an "Available Tx Power Level" parameter 373 and a "Power Request" parameter 379 described below may be used for solving the "Near-Far" problem, which is known to the person skilled in the art, and to perform any suitable algorithm for BPL calculation.

Although the scope of the present invention is not limited in this respect, an Available Tx Power Level parameter 373 (e.g. 4 bits) may be provided with 3 dB intervals down from a predefined maximal value. In some other embodiments of the invention, this parameter may be used in a network interface card (NIC) for a save power mode. A packet Duration parameter 374 (e.g. 2 bytes) may represent the duration of a current packet, e.g., in microseconds (µs).

Although the scope of the present invention is not limited in this respect, PLCP header 330 of data packet 300 may include other parameters such as, for example, a Packet Length parameter 375 (e.g. 2 bytes) that may describe the length of the current data packet in octets, a Quality of Receiving parameter 376 (e.g. 2 bits) that may be transmitted as a response to a transmitter side and may include, for example, possible values, such as: "Packet Lost" (CRC failed), "Poor" (A lot of errors has been recovered by coding), "good" (a small number of errors has been recovered by coding) or "excellent" (no errors).

In addition, PLCP header 330 may include a BPL Request type parameter 377 (e.g. 2 bits) that may be used to request for BPL to be applied during a response transmission. BPL Request type parameter 377 may include values that may be used in the "Normal" mode to request BPL using instructions such as, for example: "Transmit robust", "Use BPL same as in this packet", "Use BPL, same as for previous transmission", "See BPL request field 350 for BPL information" and the like. In addition, BPL Request type parameter 377 may include values that may be used in the "Simplified" mode such as, for example: the first bit may be "Is Description" bit, which may indicate whether or not the BPL information parameter 371 within PLCP header 330 may describe BPL in the packet. Furthermore, the second bit may be an "Is Request" bit that may indicate, for example, whether BPL is requested for a response data packet or BPL is not requested, thus allowing a responding station to apply BPL in accordance with the decision made at the transmitting station.

Although the scope of the present invention is not limited in this respect, a PLCP header 330 of data packet 300 may include a BPL request field 350. BPL request field 350 may be included within PLCP header 330 of data packet 300 depending on frame type and "freshness" of available BPL request information. In some embodiments of the invention, BPL request field 350 may include parameters such as, for example, modulation types per sub-carrier, power level per sub-carrier, an overall power level, a coding type to be applied in the response packet and the like. In some embodiments of the invention, BPL request field 350 may be included into PLCP header 330 of data packet 300 in "Normal" mode and may not be included in "Simplified" mode.

Although the scope of the present invention is not limited in this respect, in addition, PLCP header 330 may include a BPL mode parameter 378 (e.g. 1 bit) to select between "Normal" and "Simplified" modes of the feedback CSI exchange, a Power Request parameter 379 (e.g. 4 bits) to request for power level to be applied during response transmission, and a Duration Recommendation parameter 381 (e.g. 6 bits) to request the duration of the packet (in units of, for example, 200 µs) to be applied during response transmission. In addition, a CRC parameter 382 (e.g. 1 byte), a Service field parameter 383 (e.g. 1 byte) which may include a scrambler initialization and a Signal Tail parameter 384 (e.g. 6 bits) that may be used for convolutional encoding and/or decoding may also be included in PLCP header 330 of data packet 300, if desired.

Figure 4:
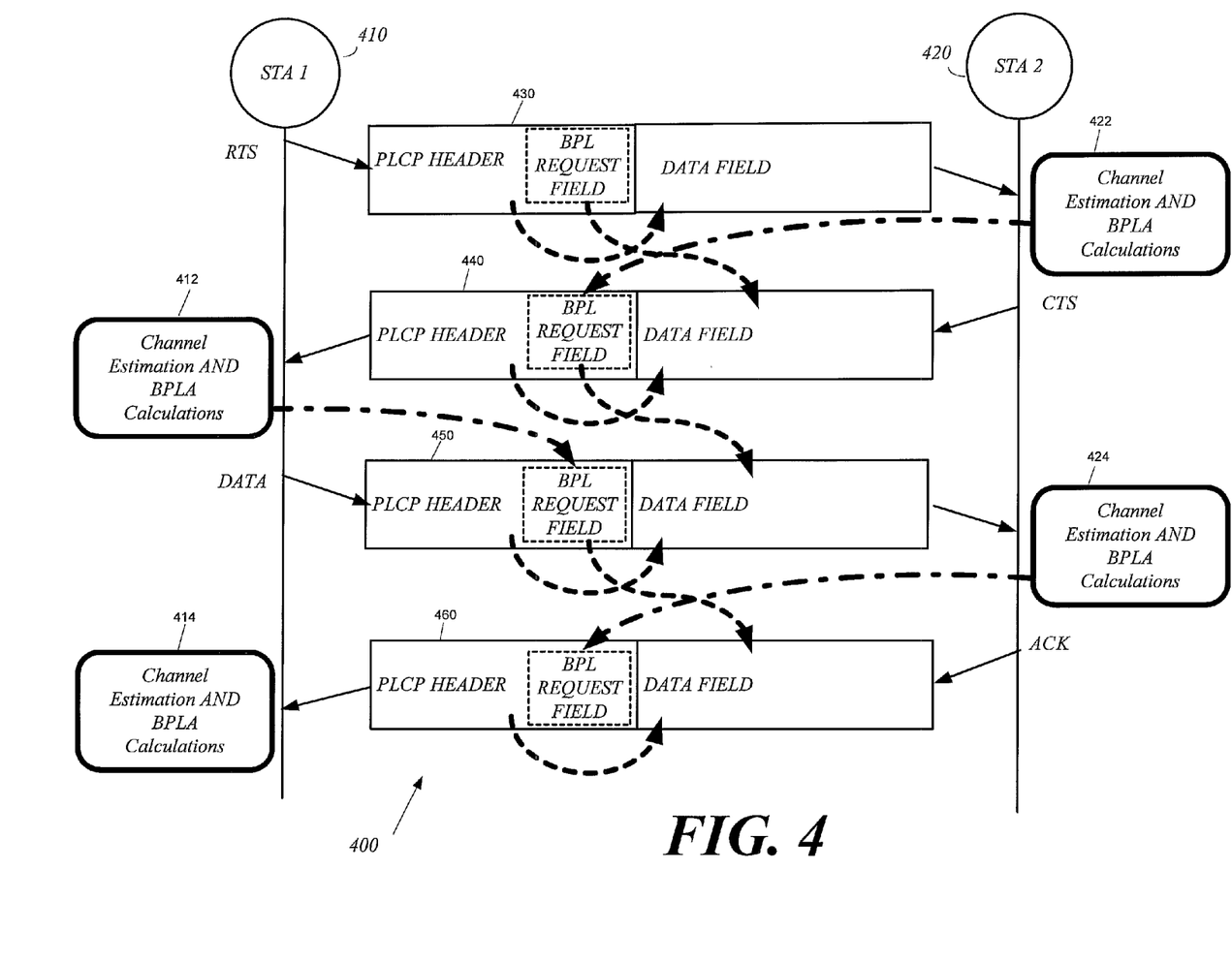
FIG. 4 is a schematic illustration of data exchange between two stations according to one exemplary embodiment of the present invention.

Turning to FIG. 4 a schematic illustration of data exchange between two stations 410 and 420 over a channel 400 according to one exemplary embodiment of the present invention is shown. Although the scope of the present invention is not limited in this respect, stations 410 and 420 may operate in OFDM communication system with channel information exchange, operating in 2.4 and/or 5 GHz bands. In some embodiments of the invention, the exchanged information may enable adaptation of physical layer parameters such as, for example, power level, modulation schemes, data rate, fragmentation of the data packets, or the like. The adaptation according to some exemplary embodiments of the present invention may be performed on a physical layer (e.g. of data packet exchange protocol layers as is known to one skilled in the art) of the station without involving a medium access control (MAC) or referring to addresses of other stations.

Although the scope of the present invention is not limited in this respect, station 410 also may be referred to as "originator" and station 420 may be referred to as "recipient". The Feedback channel state information exchange sequence between stations 410 and 420 may be as follows: sending a request to send (RTS) frame 430 by the originator (e.g. station 410) and receiving it by the recipient (e.g. station 420), sending a clear to send (CTS) frame 440 by the recipient (e.g. station 420) and receiving frame 440 by the originator (e.g. station 410), transmitting a DATA frame 450 by the originator (e.g. station 410) and receiving frame 450 by the recipient (e.g. station 420), sending by recipient (e.g. station 420) an acknowledgement (ACK) frame 460, to acknowledge the transmitted data and receiving frame 460 by the originator (e.g. station 410). The sequence of DATA frame followed by ACK frame may be repeated until the data exchange process is completed. In some embodiments of the invention, permanent on-line link adaptation may be performed during frame exchange.

Although the scope of the present invention is not limited in this respects frames 430, 440, 450 and 460 may include a PLCP header (e.g. PLCP header 330) and a DATA field (e.g. data field 340). In addition PLCP headers (e.g. PLCP header 330) of frames 430, 440, 450 and 460 may include BPL request fields (e.g. BPL request field 350). In some embodiments of the invention, frames 430, 440, 450, 460 may be modulated on substantially orthogonal sub-carriers and may be transmitted over channel 400. In addition, in some embodiments of the invention, the PLCP header of frames 430, 440, 450, 460 may be modulated on sub-carriers in accordance with a robust modulation scheme, such as, for example, a BPSK modulation scheme.

In some embodiments of the present invention, the PLCP header of frames 430, 440, 450, 460 may be encoded with a robust error-correcting codes such as, for example, a convolutional code with a coding rate of ½. The DATA fields of frames 430, 440, 450 and 460 may be modulated on sub-carriers in accordance with modulation schemes, which may be independently selected for each sub-carrier, for example, BPSK, QPSK, QAM with different order such as, for example QAM16, QAM32, QAM64, QAM128, QAM256 and the like, differential BPSK (DBPSK), differential QPSK (DQPSK), and the like. In addition, in some embodiments of the invention, the DATA fields of frames 430, 440, 450, 460 may be encoded with an adaptively selected error-correcting code, such as, for example, a convolutional code with an adaptively selected coding rate, a block encoding scheme, a Reed-Solomon code, a Turbo code, a low-density parity-check (LDCP) encoding scheme, or the like.

Although the scope of the present invention is not limited in this respect, a procedure of feedback channel information exchange may be as follows: for example, station 410 may transmit RTS frame 430. In some embodiments of the invention, station 410 may communicate in PLCP header 330 of RTS frame 430 parameters such as, for example, available transmitter power level 373, overall transmitted power level 372 BPL request type 377, BPL mode 378 and the like. Station 420 may receive RTS frame 430 and may perform estimation of channel characteristics such as, for example, a channel transfer function and the like (box 422). In addition, station 420 may use at least some of prefix, middle-fix and postfix training fields (e.g. prefix and postfix training fields 320, 360 of FIG. 3) of frame 430 to estimate the channel variation and to calculate an optimal packet duration for adaptive fragmentation purposes to be used during transmission of a next data packet by station 410, if desired. Station 420 may receive within the PLCP header 330 of RTS frame 430 information such as, for example, available power level parameter 373 and overall transmitted power level parameter 372 and the like. Although the scope of the invention is not limited in this respect, station 420 may use information received from PLCP header 330 of RTS frame 430 together with, for example, channel characteristics estimates obtained by station 420, to calculate an optimal BPL request, the duration recommendation and like parameters, and to communicate them to station 410 (box 422).

Although the scope of the present invention is not limited in this respect, station 420 may transmit CTS frame 440 and may communicate the calculated BPL request and other parameters to station 410 in a BPL request field 350 of CTS frame 440 (dash-dotted line from box 422 in FIG. 4). The BPL request may request station 410 for modulation scheme and/or power level assignments per sub-carrier to be applied for transmission of data frame 450. In addition, PLCP header 330 of CTS frame 440 may include parameters such as, for example, BPL, information 371, overall transmitted power level 372, available transmitter power level 373 and the like. While receiving CTS frame 440, station 410 may estimate the channel characteristics and may perform BPL request calculations (box 412), which may be performed, for example, using substantially the same calculation methods used by station 420, if desired. In addition, station 410 may use at least some of prefix, middle-fix and postfix training fields (e.g. prefix, middle-fix and postfix training fields 320, 345, 380 of FIG. 3) of frame 440 to estimate the channel variation and to calculate (e.g. using an optimization function) an optimal packet duration for adaptive fragmentation purposes to be used during transmission of subsequent data packets, e.g., the next data packet, by station 420.

Although the scope of the present invention is not limited in this respect, the BPL information placed in CTS frame 440 may be compared to the BPL, information calculated by station 410 to further estimate channel characteristics, such as, for example, channel variation and the Like.

Although the scope of the present invention is not limited in this respect, station 410 may modulate the DATA packet (e.g. frame 450) on sub-carriers in accordance with BPL request extracted from BPL request field 350 of CTS frame 440. For example, station 410 may assign a requested power level and a modulation scheme for the sub-carrier, and may adjust parameters of the transmitted signal according to these assignments. In some embodiments, station 410 may place BPL information derived from estimations of the channel characteristics during reception of CTS in the BPL request field of PLCP header 330 of frame 450 (as indicated by the dashed-dotted arrow line from box 412) and may transmit frame 450 to station 420. During reception of DATA frame 450, station 420 may perform channel estimation and BPL request calculations (box 424) to request station 410 to adjust its signal parameters in accordance with this BPL request during transmission of a subsequent data frame (not shown in FIG. 4). This adjustment may be performed substantially the same way as the above-described adjustment is performed during reception of RTS frame 430.

Although the scope of the present invention is not limited in this respect, station 420 may decide that channel 400 is static, for example, if the BPL information obtained during RTS frame 430 reception is generally or substantially the same as the BPL information obtained during reception of data frame 450. In addition, station 420 may use at least some of prefix, middle-fix and postfix training fields (e.g. prefix, middle-fix and postfix training fields 320, 345, 360 of FIG. 3) of frame 450 to estimate the channel variation and to calculate an optimal packet duration for adaptive fragmentation purposes to be used during transmission of next data packet by station 410.

Although the scope of the present invention is not limited in this respect, station 420 may use the BPL request type parameter 377 of PLCP header 330, for example, as follows: if the channel is categorized as "static" by station 420, the BPL request type parameter may be used to communicate the "Use BPL as in previous packet" instruction cause the station 410 to apply the BPL of data packet 450 to a next data packet (not shown in the FIG. 4). In some embodiments of the invention, such use of BPL request type parameter 377 by station 420 may reduce the amount of channel state feedback information transmitted between stations 410 and 420.

Although the scope of the present invention is not limited in this respect, station 420 may modulate the ACK frame (e.g. frame 460) on the sub-carriers in accordance with BPL request extracted from BPL request field 350 of DATA Fame 450, if desired. For example, station 420 may assign a requested power level and/or modulation scheme for the sub-carrier and may adjust transmitted signal parameters according to this assignment.

Although the scope of the present invention is not limited in this respect, station 420 may perform the channel estimation and BPL request calculations (box 424) and place the BPL, request into BPL request field 350 in PLCP header 330 of ACK frame 460 (shown with dash-dotted arrow line from box 424). Station 420 may confirm successive data reception by transmitting ACK frame 460 to station 410. In some embodiments of the present invention station 410 may estimate the channel during reception of ACK frame 460 and may decide that the channel is static. In the case of such a decision, station 410 may use the BPL request type parameter of the next data frame (not shown in the FIG. 4) to communicate the "Use BPL as in previous packet" instruction to cause station 420 to apply the BPL of ACK packet 460 to the next packet (not shown in the FIG. 4), which may be transmitted from station 420 to station 410. For example, such use of BPL request type parameter 377 by station 410 may further reduce the amount of channel state feedback information transmitted between stations 410 and 420.

Figure 5:
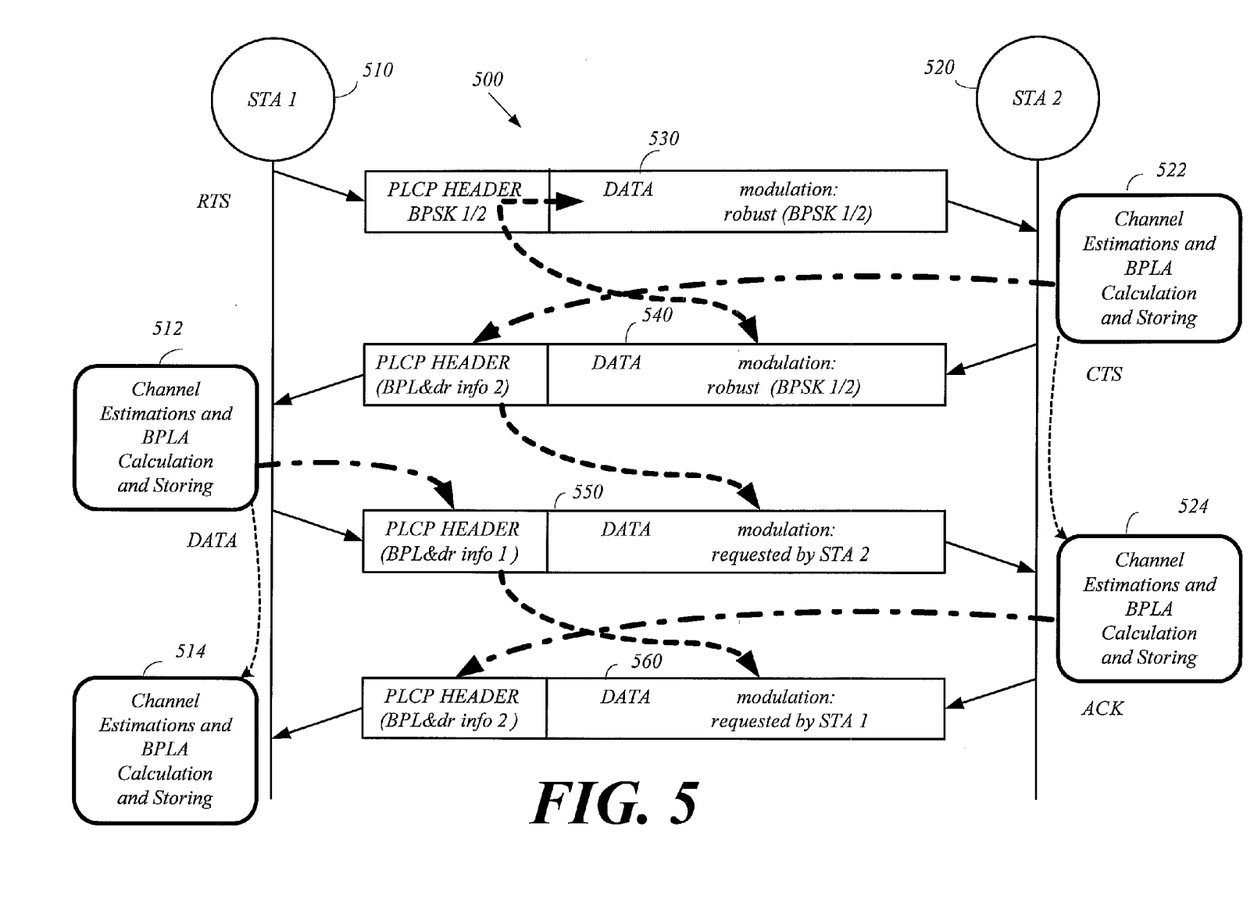
FIG. 5 is a schematic illustration of data exchange between two stations according to another exemplary embodiment of the present invention.

Turning to FIG. 5, a schematic illustration of data exchange between two stations (e.g. stations 510, 520) according to another exemplary embodiment of the present invention is shown. Although the scope of the present invention is not limited in this respect, at least one notable difference between the embodiment of FIG. 4 and this embodiment may be excluding the BPL request field (e.g. BPL request field 350) from PLCP header 330 and passing its functionality to BPL information parameter 371 of PLCP header 330 of the packet. In this case, BPL information parameter 371 of PLCP header 330 may be used to pass feedback channel state information and/or BPL information from the recipient (e.g. station 520) to the originator (e.g. station 510) and/or vice versa.

Although the scope of the present invention is not limited in this respect, frames 530, 540, 550 and 560 may include a PLCP header (e.g. PLCP header 330) and a DATA field (e.g. DATA field 340). In some embodiments of the invention, frames 530, 540, 550, 560 may be modulated on sub-carriers in accordance with OFDM modulation schemes and may be transmitted over channel 500. In embodiments of the present invention, the PLCP header of frames 530, 540, 550, 560 may be modulated on sub-carriers in accordance with a robust modulation scheme such as, for example, a BPSK modulation scheme, and encoded with a robust error-correcting code such as, for example, a convolutional code with a coding rate of ½, although the scope of present invention is not limited in this respect.

For example, the DATA fields of frames 530, 540, 550 and 560 may be modulated on sub-carriers in accordance with modulation schemes, which may be independently selected per sub-carrier, such as, for example, BPSK, QPSK, QAM with different order such as, for example, QAM16, QAM32, QAM64, QAM128, QAM256 and the like, DBPSK, DQPSK, and the like. In addition, in some embodiments of the present invention, the DATA fields of frames 530, 540, 550, 560 may be encoded with an adaptively selected error-correcting code such as, for example, a convolutional code with an adaptively selected coding rate.

Although the scope of the present invention is not limited in this respect, station 510 may be referred to herein as "originator" and station 590 may be referred to herein as "recipient". Although the scope of the present invention is not limited in this respect, the feedback channel state information exchange sequence between stations 510, 520 may be as follows: sending RTS frame 530 by the originator (e.g. station 510) and receiving frame 530 by the recipient (e.g., station 520), sending a CTS frame 540 by the recipient (e.g. station 520) and receiving frame 540 by the originator (e.g. station 510), transmitting data frame 550 by the originator (e.g. station 510) and receiving frame 550 by the recipient (e.g. station 520), sending from the recipient (e.g. station 520) ACK frame 560 (to acknowledge the transmitted data) and receiving frame 560 by the originator (e.g. station 510). The sequence DATA, ACK frame transmission/reception until the data exchange process is completed. In some embodiments of the invention, permanent on-line adaptation may be performed during frame exchange.

Although the scope of the present invention is not limited in this respect, the originator (e.g. station 510) may transmit RTS frame 530, during which time the recipient (e.g. station 520) may estimate different channel characteristics. Although the scope of the present invention is not limited in this respect, RTS frame 530 may be modulated on sub-carriers in accordance with a robust, e.g., the most robust, modulation scheme or any other suitable modulation scheme for the sub-carriers. The originator (e.g. station 510) may modulate RTS frame 530 on sub-carriers in accordance with a desired, e.g., individually selected, modulation scheme of the sub-carriers, for example, the originator (e.g. station 510) may be updated with BPL information. In some embodiments of invention, the originator (e.g. station 510) may embed the BPL, information used for transmission of RTS frame 530 into BPL information parameter 371 of PLCP header of RTS frame 530.

In addition, the originator (e.g. station 510) may set a first bit (e.g. an "Is Description" bit) of BPL Request parameter 377 of PLCP header 330 of RTS frame 530, thus requesting the recipient (e.g. station 520) to use the BPL information parameter 371 of PLCP header of RTS frame 530 to demodulate the RTS frame 530. In addition, a second bit (e.g. "Is Request" bit) of BPL Request parameter 377 of PLCP header 330 of RTS frame 530 may be set to request the recipient (e.g. station 520) to use similar BPL information during transmission of CTS frame 540.

In some embodiments of the invention, the requested BPL information may be stored in a memory of the originator (e.g. station 510) and may be used to demodulate response CTS frame 540. In addition, "Available power level" parameter 373 and transmitted power level parameter 372 may be included in the PLCP header of RTS frame 530 that may be used together with channel estimation performed by the recipient (e.g. station 520). "Available power level" parameter 373 and transmitted power level parameter 372 may allow the recipient (e.g. station 520) to calculate an optimal BPL request to be used by the originator (e.g. station 510) during transmission of data frame 550 in order to provide optimal receiving conditions at the recipient (e.g. station 520).

Although the scope of the present invention is not limited in this respect, recipient (e.g. station 520) may respond with CTS frame 540 modulated on sub-carriers in accordance with the modulation schemes requested by the originator (e.g. station 510) through BPL information parameter 371 together with the "Is Request" bit in BPL request type parameter 377 in the PLCP header of RTS frame 530. The BPL request calculated during reception of RTS frame 530 may be embedded by recipient (e.g. station 520) in the BPL information parameter 371 of PLCP header of CTS frame 540. The "Is Description" bit in PLCP header of CTS fame 540 may be cleared, thus causing the originator (e.g. station 510) to use its stored BPL information to demodulate the received packet. In addition, the "Is request" bit in the PLCP header of CTS frame 540 may be set to cause the originator (e.g. station 510) to modulate the data frame 550 on sub-carriers using modulation assignments and/or adjusting power levels of a sub-carrier in accordance with a BPL request communicated in BPL information parameter 371 in the PLCP header of CTS frame 540.

Although the scope of the present invention is not limited in this respect, the originator (e.g. station 510), while receiving CTS frame 540, may estimate the channel characteristics, perform BPL calculations (box 512) and may store resulting BPL information in a memory, if desired.

Although the scope of the present invention is not limited in this respect, the originator (e.g. station 510) may transmit a DATA packet 550 modulated in accordance with the BPL request communicated in the PLCP header of CTS frame 540. The BPL information parameter 371 in the PLCP header of DATA frame 550 may include BPL information calculated by the originator (e.g. station 510) during reception of CTS frame 540. The "Is Description" bit in the PLCP header of data fame 550 may be cleared, thus causing the recipient (e.g. station 520) to use its stored BPL information to demodulate the data frame 550. In addition, the "Is request" bit in the PLCP header of DATA frame 550 may be set to cause the recipient (e.g. station 520) to modulate the ACK frame 560 on sub-carriers in accordance with the BPL request communicated in BPL information parameter 371 in the PLCP header of DATA frame 550.

Although the scope of the present invention is not limited in this respect, during data reception, the recipient (e.g. station 520) may estimate different channel characteristics, which may have changed during the time period between frames 530 and 550, and calculate a BPL to be applied during the next data frame (not shown) transmission. Using both prefix and postfix training fields in the DATA packet, the recipient (e.g. station 520) may estimate the channel variation and calculate an optimal packet duration, e.g., for adaptive fragmentation purposes, to be used during transmission of the next data frame by the originator (e.g. station 510).

Although the scope of the present invention is not limited in this respect, the recipient (e.g. station 520) may confirm successive data receptions by transmitting the ACK frame 560. The PLCP header of ACK frame 560 may include BPL information obtained during data packet reception to provide the originator (e.g. station 510) with updated BPL information.

Although the scope of present invention is not limited in this respect, the DATA field of ACK frame 560 may be modulated on sub-carriers in accordance with a BPL request communicated in the PLCP header of data frame 550, and originator (e.g. station 510) may demodulate the ACK frame 560 using its stored BPL information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of communication over a wireless channel comprising:
    receiving a request to send (RTS) frame that includes a header including a field that includes a modulation scheme parameter, the header further including a bit to select a mode of a feedback channel state information (CSI) exchange scheme;
    exchanging data over a channel based on the selected mode of the CSI exchange scheme;
    adapting a physical layer parameter based on exchanged channel information and exchanging over said channel the adapted physical layer parameter; and
    modulating with a modulation scheme at least a portion of a response frame based on the channel state information and said modulation scheme.

2. The method of claim 1, comprising:
    providing information calculated based on information in a predefined field of a first exchanged data packet to a header of a second exchanged data packet.

3. The method of claim 2, comprising:
    determining a data exchange mode according to information included in the first exchanged data packet.

4. The method of claim 2, comprising:
    providing channel feedback information and information to be used to demodulate the second exchanged data packet based on training information included in the first exchanged data packet.

5. The method of claim 2 comprising:
    exchanging feedback information for adaptive fragmentation of the second exchanged data packet.

6. A wireless communication station comprising:
    a receiver to receive a request to send (RTS) frame that includes a header including a field which includes a modulation scheme parameter, the header further including a bit to select a mode of a channel state information (CSI) exchange scheme;
    a processor to control an exchange of data channel information between two or more stations based on the selected mode of the CSI exchange scheme, to adapt a physical layer parameter based on exchanged channel information and to exchange over a channel the adapted physical layer parameter; and
    a modulator to modulate according to a modulation scheme at least a portion of a response frame based on the channel state information and said modulation scheme.

7. The wireless communication station of claim 6, comprising:
   a data packet generator to apply said physical layer parameter to a predetermined field of an exchanged data packet.

8. The wireless communication station of claim 7, wherein the processor is to determine a data exchange mode according to information included in the exchanged data packet.

9. The wireless communication station of claim 7, wherein the processor is to estimate a transfer function during reception of the exchanged data packet and to use information relating to transmitted power in the exchanged data packet to calculate the physical layer parameter.

10. A wireless communication station comprising:
   a dipole antenna to exchange an exchanged data packet with another wireless communication station;
   a receiver to receive a request to send (RTS) frame that includes a header including a field which includes a modulation scheme parameter, the header further including a bit to select a mode of channel state information (CSI) exchange scheme;
   a processor to control an exchange of data channel information between two or more stations based on the selected mode of the CSI exchange scheme, to adapt a physical layer parameter based on exchanged channel information and to exchange over a channel the adapted physical layer parameter; and
   a modulator to modulate according to a modulation scheme at least a portion of a response frame based on the channel state information and said modulation scheme.

11. The wireless communication station of claim 10, comprising:
   a data packet generator to apply said physical layer parameter to a predetermined field of the exchanged data packet.

12. The wireless communication station of claim 10, wherein the processor is to determine a data exchange mode according to information included in the exchanged data packet.

13. The wireless communication station of claim 10, wherein the processor is to estimate a transfer function during reception of the exchanged data packet and to use information relating to transmitted power in the exchanged data packet to calculate the physical layer parameter.

14. A wireless communication system comprising:
   two or more stations to exchange an exchanged data packet wherein, a station of the two or more station includes:
   a receiver to receive a request to send (RTS) frame that includes a header including a field that includes a modulation scheme, the header further including a bit to select a mode of a channel state information (CSI) exchange scheme;
   a processor to control an exchange of data channel information between two or more stations based on the selected mode of the CSI exchange scheme, to adapt a physical layer parameter based on exchanged channel information and to exchange over a channel the adapted physical layer parameter; and
   a modulator to modulate according to a modulation scheme at least a portion of a response frame based on the channel state information and said modulation scheme.

15. The wireless communication system of claim 14, comprising:
   a data packet generator to apply said physical layer parameter to a predetermined field of the exchanged data packet.

16. The wireless communication system of claim 14, wherein the processor is to determine a data exchange mode according to information included in the exchanged data packet.

17. The wireless communication system of claim 14, wherein the processor is to estimate a transfer function during reception of the exchanged data packet and to use information relating to transmitted power in the exchanged data packet to calculate the physical layer parameter.

18. A processor operably coupled to a storage medium, having stored thereon instructions, that when executed, result in:
   receiving a frame that includes a header including a field that includes a modulation scheme parameter, wherein the header further includes a bit to select a mode of a channel state information (CSI) exchange scheme;
   exchanging data between two or more stations based on the selected mode of the CSI exchange scheme;
   adapting a physical layer parameter based on exchanged channel information and exchanging over a channel the adapted physical layer parameter; and
   modulating with a robust modulation scheme at least a portion of a response frame based on the channel state information and said modulation scheme.

19. The processor of claim 18, wherein the instructions when executed, result in:
   providing information calculated based on information in a predefined field of a first exchanged data packet to a header of a second exchanged data packet.

20. The processor of claim 19, wherein the instructions when executed, result in:
   providing channel feedback information and information to be used to demodulate the second exchanged data packet based on training information included in the first exchanged data packet.

21. The processor of claim 19, wherein the instructions when executed, result in:
   determining a data exchange mode according to information included in the first exchanged data packet.

22. The processor of claim 19, wherein the instructions when executed, result in:
   exchanging feedback information for adaptive fragmentation of the second exchanged data packet.

* * * * *